No. 851,785. PATENTED APR. 30, 1907.
W. H. TILSON.
CUTTING APPARATUS FOR CORN HARVESTERS.
APPLICATION FILED DEC. 31, 1906.
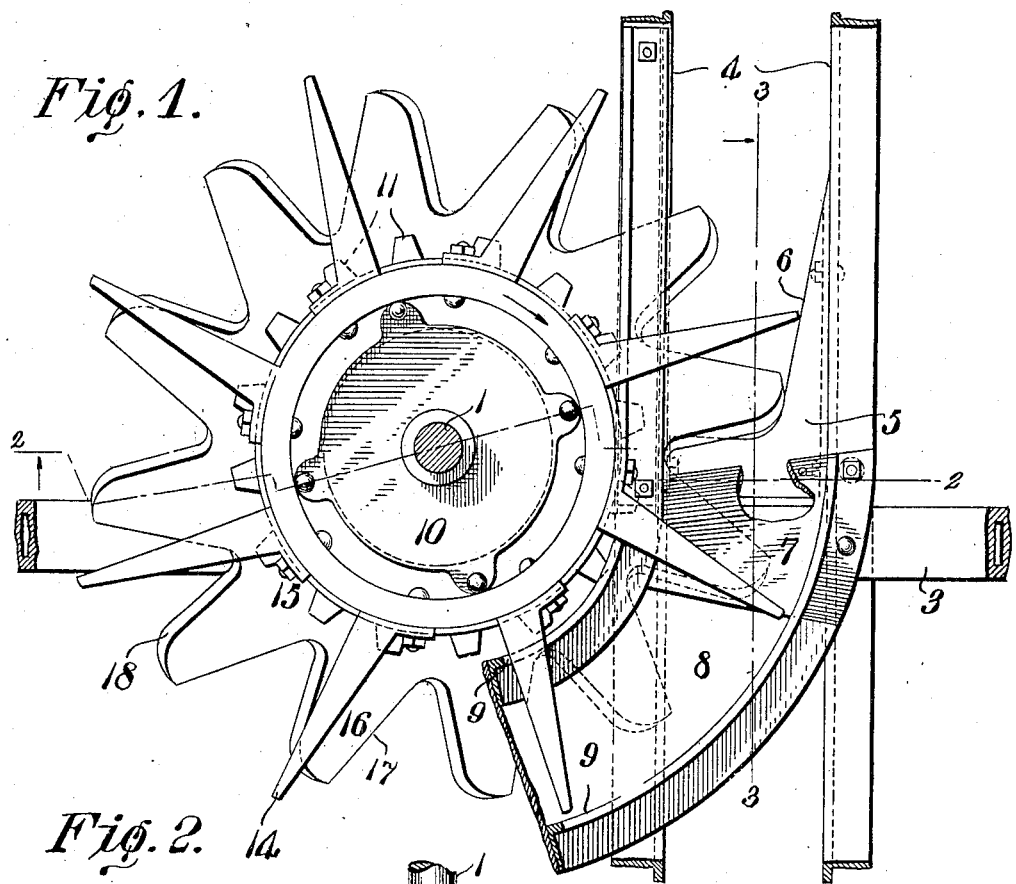
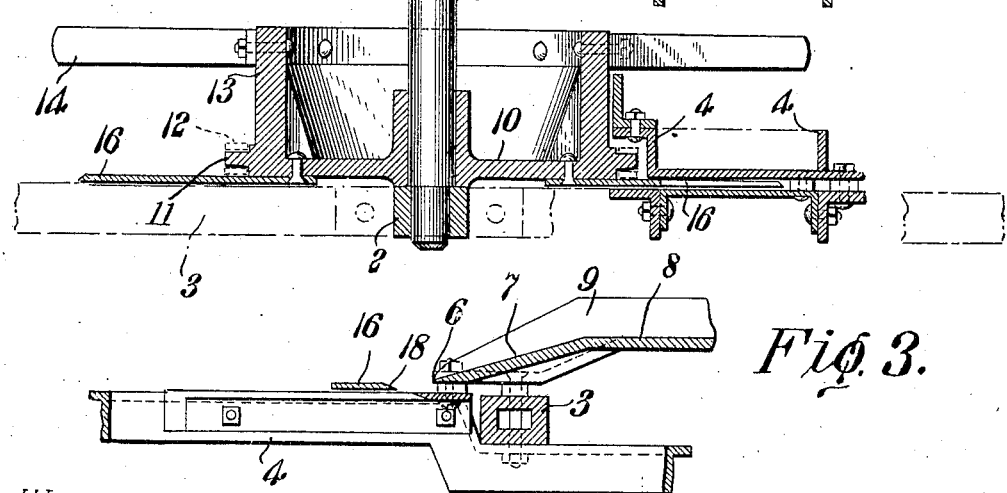
WITNESSES:
William H. Tilson, INVENTOR
By C. A. Snow & Co.
ATTORNEYS

UNITED STATES PATENT OFFICE.

WILLIAM H. TILSON, OF PLAINVIEW, TEXAS.

CUTTING APPARATUS FOR CORN-HARVESTERS.

No. 851,785.  Specification of Letters Patent.  Patented April 30, 1907.

Application filed December 31, 1906. Serial No. 350,179.

*To all whom it may concern:*

Be it known that I, WILLIAM H. TILSON, a citizen of the United States, residing at Plainview, in the county of Hale and State of Texas, have invented a new and useful Cutting Apparatus for Corn-Harvesters, of which the following is a specification.

This invention has relation to cutting apparatus for corn harvesters and it consists in the novel construction and arrangement of its parts as hereinafter shown and described.

The object of the invention is to provide a blade mounted for rotation and which is provided at its edge with serrations, some of the sides of which are rearwardly curved toward their outer portions. The said curved sides of the serrations are sharpened and are adapted to co-operate with a fixed blade attached to the stalk guides of the implement. Said fixed blade is also curved and in effect a shearing cut is given to the stalks as they pass between the rotating blade and the fixed blade. By such arrangement it requires but a single stroke from one of the rotating blades to sever a stalk. The said rotating blade is mounted upon a wheel which in turn is rotated by a sprocket chain. An annular flange is located upon the upper surface of said wheel and radially extending fingers are bolted or otherwise attached to said flange. The said fingers are in elevated positions with relation to the rotating blade, and are adapted to engage the stalks and bend them slightly over the fixed blade so that the fiber of the stalk may be stretched as it is engaged by the rotating blade and thus facilitate the cutting of the same. The fixed blade is located at the rear ends of corn-guides and in the rear of the said fixed blade is located a skid and up the said skid the stalks as they are cut are shunted by the said fingers and are moved along until they are taken up by other parts of the apparatus for further treatment or manipulation.

In the accompanying drawing:—Figure 1 is a top plan view of the cutting apparatus. Fig. 2 is a vertical sectional view of the same cut on line 2—2 of Fig. 1, and Fig. 3 is a section cut on the line 3—3 of Fig. 1.

The cutting apparatus comprises a vertically disposed shaft 1 journaled at its lower end in a bearing 2 which in turn is mounted upon the frame 3 of the implement. The inner and outer corn-guides 4, 4 are attached at their rear ends to the frame 3. Said guides are spaced apart in substantial parallel relation at their rear portion. The blade 5 is located between the rear portions of the corn-guides 4, 4. The said blade 5 is provided with a cutting edge 6, a portion of which extends substantially transversely with relation to the corn-guides 4, 4 and another portion extends at an acute angle with relation to the longitudinal axes of the said guides 4. The said portions of the cutting edge 6 are joined together by an obtund curved portion. The inclined skid 7 is located in the rear of the cutting edge of the blade 5. The said skid leads up to the horizontal passage 8, which for a distance, passes around concentric with the center of the shaft 1. The side rails 9, 9 also follow the said passage 8 and are adapted to confine the butt ends of the stalks upon the said passage in a manner as will be hereinafter explained.

The wheel 10 is fixed to the shaft 1 and is provided at its periphery with the sprocket teeth 11 which co-operate with the moving sprocket chain 12 for rotating the said wheel 10 and shaft 1. The annular flange 13 is vertically disposed and located at the outer portions of the said wheel 10. The radially extending fingers 14 are bolted or otherwise secured to the outer face of the flange 13. The said fingers are of such length as to substantially extend all the way across the space between the corn-guides 4, 4 as they pass over the cutting edge of the blade 5. Consequently, the said fingers as they engage the sides of the stalks that pass between the guides 4, 4 will bend the said stalks slightly to the rear over the cutting edge of the blade 5 and consequently, stretch the fiber of the stalk and render the same easy of severance.

The annular blade 15 is attached to the wheel 10. Said blade 15 is provided at its periphery with the serrations 16 which have the straight sides 17 and the curved sides 18. The said curved sides 18 are sharpened and are adapted to cooperate with the cutting edges of the blade 5 in severing the stalks. As the curved sides 18 pass over the cutting edge 6 of the blade 5 the end of the serrations 16 passes beyond the transverse portion of the edge 6 and overlaps the portion thereof which extends at an acute angle to the longitudinal axes of the corn-guides 4. Thus the curved sharpened side 18 of the serrations 16 pass along the entire length of the transverse portion of the edge 6 of the blade 5 and the stalks that are in engagement with the said portions of the blade 5 are severed.

The fingers 14 carry the stalks along and shunt them up the skid 7 and along the platform 8 from which point they are delivered to other parts of the implement not shown. As shown in the drawing, the blade 15 operates above the blade 5 but the said blades may be reversed in position without altering or materially changing their method of co-operation.

Having described my invention what I claim as new and desire to secure by Letters-Patent is:—

1. A cutting apparatus for corn harvesters comprising corn-guides, a blade fixed between said guides, said blade having a cutting edge provided with a portion which extends transversely with relation to the guides and a portion which extends at an acute angle with relation to the longitudinal axes of the guides, a blade co-operating with said fixed blade, said blade having a serrated edge provided with curved sharpened edges and means for rotating said blade.

2. A cutting apparatus for corn harvesters comprising corn-guides, a blade fixed between the said guides, a skid located at the rear of said blade and inclined upward and rearwardly with relation to the same, a circular blade co-operating with the first said blade and having a cutting edge which passes under said skid, and rotating fingers located above the circular blade.

3. A cutting apparatus for corn harvesters comprising corn-guides, a blade fixed between said guides and having a cutting edge, a part of which extends transversely with relation to said guides and a part of which is located at an acute angle with relation to the longitudinal axes of the guides, a curved portion joining said parts together, a circular blade journaled for rotation and having a serrated periphery, the sides of which serrations are curved, and sharpened to co-operate with the cutting edge of the fixed blade.

In testimony that I claim the foregoing as my own, I have hereto affixed my signature in the presence of two witnesses.

WILLIAM H. TILSON.

Witnesses:
  OAT MARTINE,
  JOHN Y. LIGON